(12) United States Patent
Hirukawa

(10) Patent No.: US 11,831,455 B2
(45) Date of Patent: Nov. 28, 2023

(54) MEETING SUPPORT SYSTEM, MEETING SUPPORT METHOD, AND RECORDING MEDIUM RECORDING MEETING SUPPORT PROGRAM

(71) Applicant: SHARP KABUSHIKI KAISHA, Sakai (JP)

(72) Inventor: Keiko Hirukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/861,670

(22) Filed: Jul. 11, 2022

(65) Prior Publication Data

US 2023/0025512 A1 Jan. 26, 2023

(30) Foreign Application Priority Data

Jul. 21, 2021 (JP) .................................. 2021-120341

(51) Int. Cl.
  *H04L 12/18* (2006.01)
(52) U.S. Cl.
  CPC ...... *H04L 12/1822* (2013.01); *H04L 12/1818* (2013.01)
(58) Field of Classification Search
  CPC .......................... H04L 12/1822; H04L 12/1818
  See application file for complete search history.

(56) References Cited

U.S. PATENT DOCUMENTS

| | | | |
|---|---|---|---|
| 2005/0010464 A1 | 1/2005 | Okuno et al. | |
| 2007/0283278 A1* | 12/2007 | Hupfer | G06F 9/542 |
| | | | 715/751 |
| 2012/0327175 A1* | 12/2012 | Couse | H04L 12/1818 |
| | | | 348/E7.083 |
| 2016/0255126 A1* | 9/2016 | Sarris | H04L 65/1096 |
| | | | 348/14.08 |
| 2017/0099361 A1* | 4/2017 | Digilov | H04L 65/403 |
| 2018/0176267 A1* | 6/2018 | Malatesha | H04L 65/403 |
| 2021/0067360 A1* | 3/2021 | Yoon | G06Q 10/02 |

FOREIGN PATENT DOCUMENTS

| | | |
|---|---|---|
| JP | 2005-31944 A | 2/2005 |
| JP | 6309362 B2 | 4/2018 |

* cited by examiner

*Primary Examiner* — John A Follansbee
*Assistant Examiner* — Raqiul A Choudhury
(74) *Attorney, Agent, or Firm* — ScienBiziP, P.C.

(57) ABSTRACT

A meeting support system includes: an acquisition processor that acquires medium information corresponding to a communication medium installed in the meeting room by communication of the user terminal with the communication medium; and a permission processor that identifies a meeting in which a user is scheduled to participate acquired from the user terminal, on the basis of user information for identifying the user and the medium information acquired from the user terminal. The permission processor permits login to a meeting support application of the identified meeting.

7 Claims, 10 Drawing Sheets

| MEETING RESERVATION INFORMATION ||||||||
|---|---|---|---|---|---|---|---|
| MEETING DATE | MEETING TIME | MEETING ROOM ID | MEETING NAME | RESERVING PERSON'S ID | MEETING URL | ATTENDANCE | ATTACHED MATERIAL |
| 2021/04/10 | 10:30-11:00 | R0001 | REGULAR MEETING | U001 | ... | ... | ... |
| 2021/04/10 | 16:30-17:00 | R0001 | BUDGET MEETING | U001 | ... | ... | ... |
| 2021/04/11 | 14:30-15:00 | R0002 | MANAGEMENT MEETING | U021 | ... | ... | ... |
| ... | ... | ... | ... | ... | ... | ... | ... |

| MEETING ROOM INFORMATION |||||
|---|---|---|---|---|
| TAG ID | MEETING ROOM ID | MEETING ROOM NAME | MEETING ROOM TERMINAL ID | DEVICE ID |
| N001 | R0001 | MEETING ROOM 1 | PC0001 | D0011, D0012, D0013 |
| N002 | R0002 | MEETING ROOM 2 | PC0002 | D0021, D0022 |
| ... | ... | ... | ... | ... |

| DEVICE INFORMATION | | |
|---|---|---|
| DEVICE ID | DEVICE NAME | IP ADDRESS |
| PC0001 | PC | 192.168.01 |
| PC0002 | PC | 192.168.02 |
| D0011 | DISPLAY | 192.168.11 |
| D0012 | SCREEN SHARING DEVICE | 192.168.12 |
| D0013 | PRINTER | 192.168.13 |
| D0021 | DISPLAY | 192.168.21 |
| D0022 | SCREEN SHARING DEVICE | 192.168.22 |
| ... | ... | ... |

| USER INFORMATION | | |
|---|---|---|
| USER ID | USER NAME | AUTHENTICATION INFORMATION |
| U001 | U1 | token-u1 |
| U002 | U2 | token-u2 |
| U003 | U3 | token-u3 |
| ... | ... | ... |

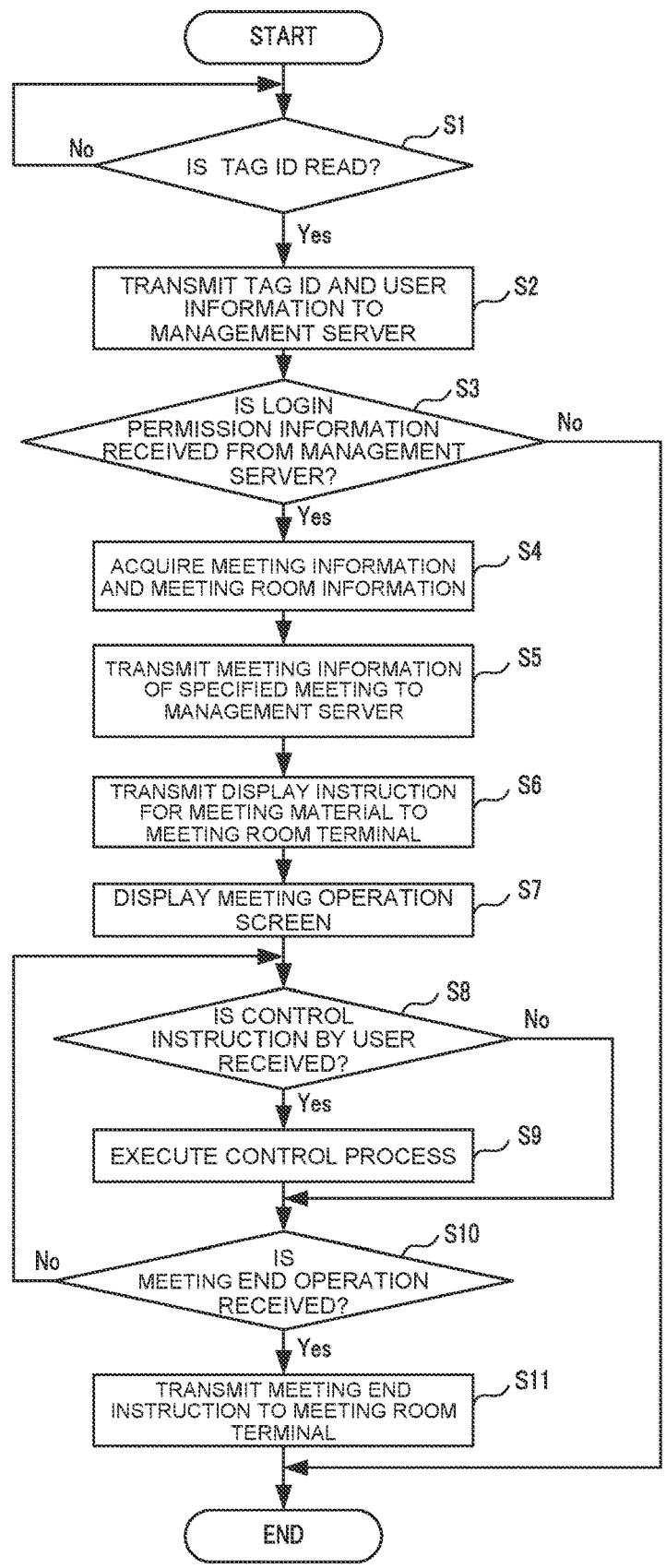

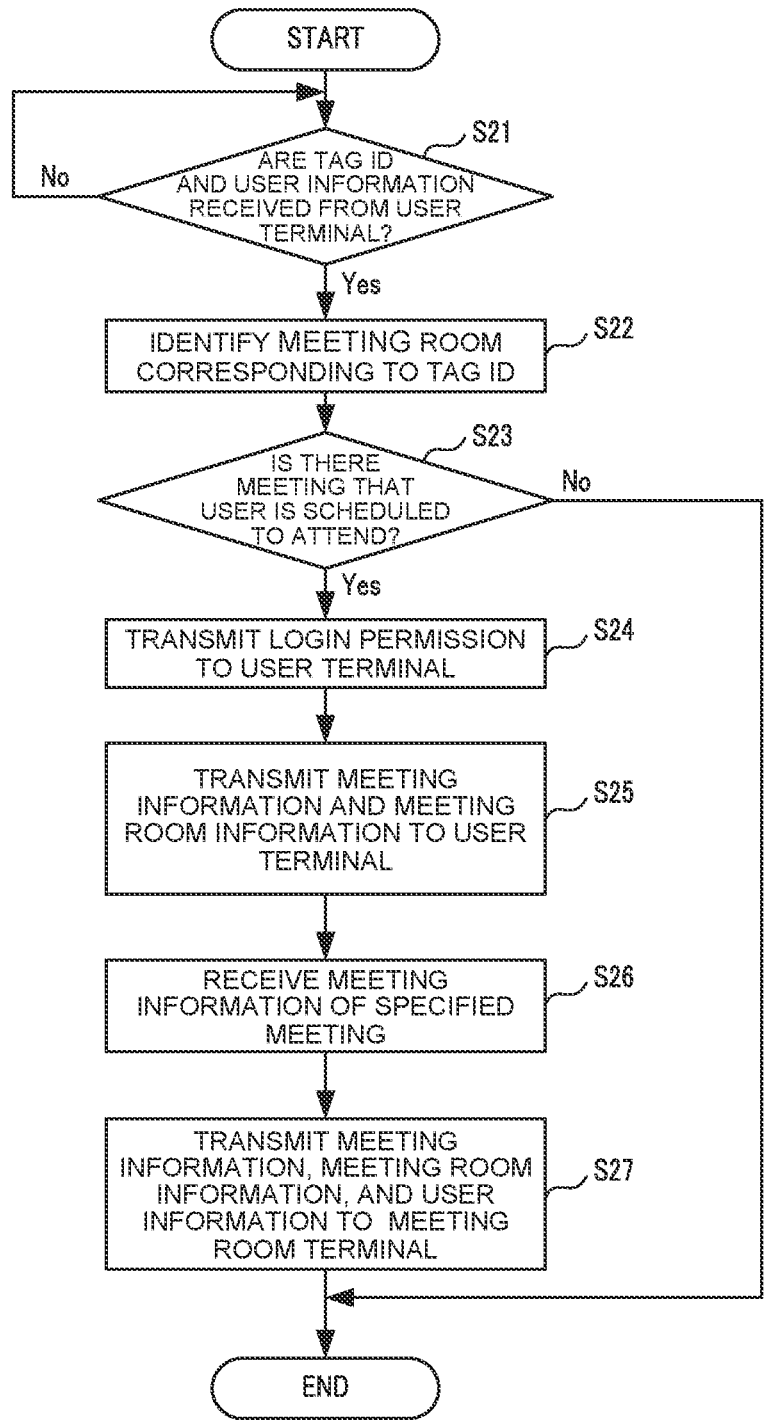

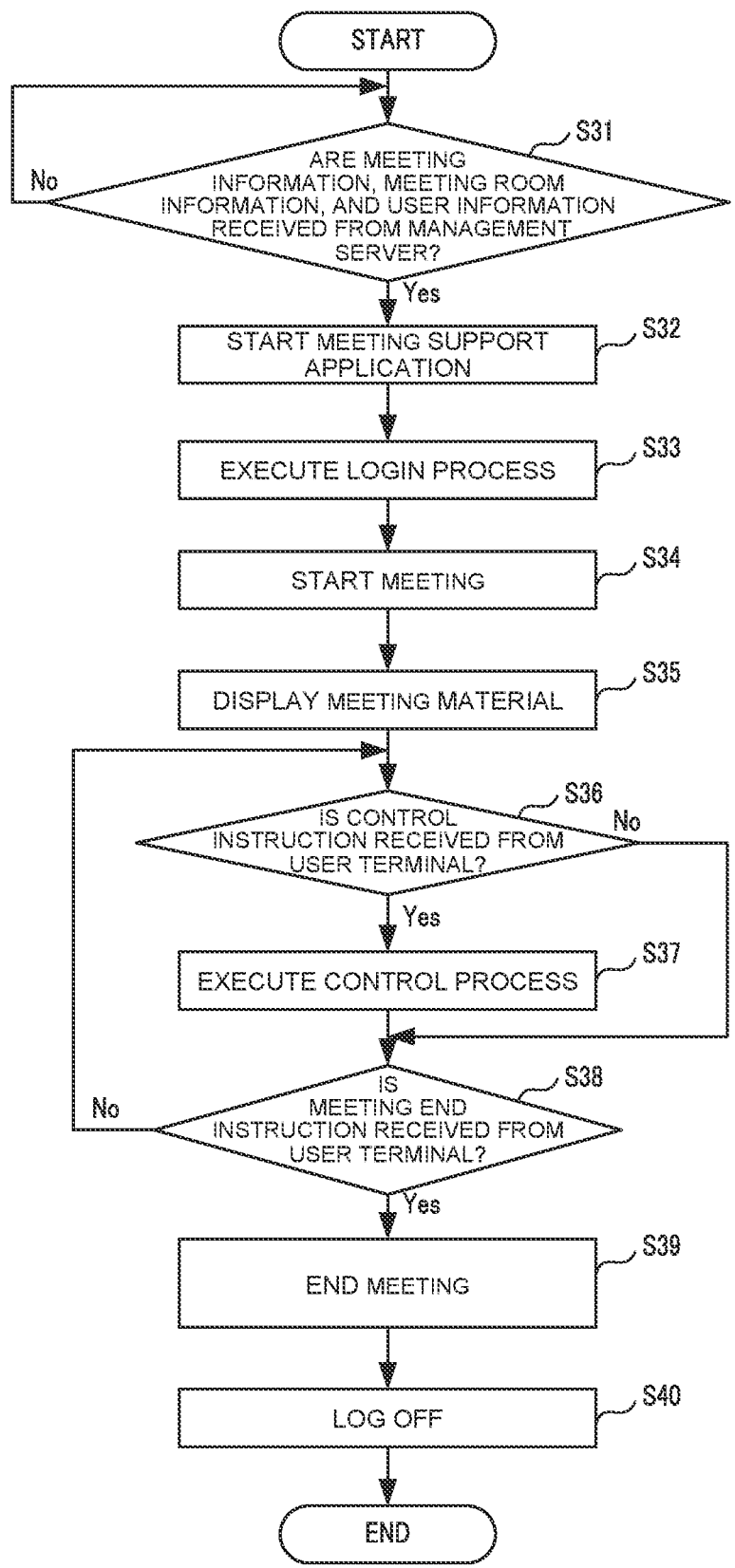

MEETING SUPPORT SYSTEM, MEETING SUPPORT METHOD, AND RECORDING MEDIUM RECORDING MEETING SUPPORT PROGRAM

INCORPORATION BY REFERENCE

This application is based upon and claims the benefit of priority from the corresponding Japanese Patent Application No. 2021-120341 filed on Jul. 21, 2021, the entire contents of which are incorporated herein by reference.

BACKGROUND

The present disclosure relates to a meeting support system, a meeting support method, and a recording medium recording a meeting support program.

In recent years, a meeting system (online meeting) in which voice, video, a file, and the like are transmitted/received at mutually separated places through a network, is introduced. In addition, a technology for making a meeting room available by matching user information read from an IC card with reservation information of a meeting room, a technology for acquiring user information read from an IC card and meeting room entry/exit times and managing the above as a meeting result, and other technology are conventionally known.

Herein, in a case where a meeting is started, a user must execute an operation for starting a meeting support application for executing online meeting on a meeting room terminal (PC) installed in a meeting room, an operation for inputting login information (such as a user ID and a password) on a meeting support application screen, and other operation. Therefore, a time-consuming problem when starting a meeting arises.

SUMMARY

An object of the present disclosure is to provide a meeting support system, a meeting support method, and a recording medium recording a meeting support program capable of easily starting a meeting.

A meeting support system according to an aspect of the present disclosure is a system that includes a user terminal of a user who participates in a meeting in a meeting room, and executes a meeting support application of the meeting. The meeting support system includes: an acquisition processor that acquires medium information corresponding to a communication medium installed in the meeting room by communication of the user terminal with the communication medium; and a permission processor that identifies a meeting in which the user is scheduled to participate, on the basis of user information for identifying the user and the medium information. The permission processor permits login to a meeting support application of the identified meeting.

A meeting support method according to another aspect of the present disclosure is a method for executing a meeting support application of a meeting in which a user participates in a meeting room. In the meeting support method, one or a plurality of processors executes an acquisition step of acquiring medium information corresponding to a communication medium of the user installed in the meeting room by communication of the user terminal with the communication medium: and a permission step of identifying a meeting in which the user is scheduled to participate, on the basis of user information for identifying the user and the medium information, and permitting login to a meeting support application of the identified meeting.

A recording medium according to another aspect of the present disclosure records a program for executing a meeting support application of a meeting in which a user participates in a meeting room. The program is a program for causing one or a plurality of processors to execute: an acquisition step of acquiring medium information corresponding to a communication medium of the user installed in the meeting room by communication of the user terminal with the communication medium; and a permission step of identifying a meeting in which the user is scheduled to participate, on the basis of user information for identifying the user and the medium information, and permitting login to a meeting support application of the identified meeting.

According to the present disclosure, it is possible to provide a meeting support system, a meeting support method, and a recording medium recording a meeting support program that are capable of easily starting a meeting.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of a meeting reservation information management table according to the embodiment of the present disclosure.

FIG. 4 is a diagram illustrating an example of a meeting room information management table according to the embodiment of the present disclosure.

FIG. 5 is a diagram illustrating an example of a device information management table according to the embodiment of the present disclosure.

FIG. 6 is a diagram illustrating an example of a user information management table according to the embodiment of the present disclosure.

FIG. 12 is a flowchart for illustrating an example of a procedure of a meeting support process executed by the user terminal according to the embodiment of the present disclosure.

FIG. 13 is a flowchart for illustrating an example of the procedure of the meeting support process executed by a management server according to the embodiment of the present disclosure.

FIG. 14 is a flowchart for illustrating an example of the procedure of the meeting support process executed by a meeting room terminal according to the embodiment of the present disclosure.

DETAILED DESCRIPTION

Hereinafter, an embodiment of the present disclosure will be described with reference to the accompanying drawings. The following embodiment is merely an example that embodies the present disclosure, and does not intend to limit the technical scope of the present disclosure.

A meeting support system according to the present disclosure can be applied, for example, to an online meeting in which a plurality of users at different locations (meeting rooms) participate. A meeting system according to this embodiment is an example of the meeting support system of the present disclosure. For example, in the meeting system according to this embodiment, a user terminal used by a user who participates in a meeting, a meeting room terminal on which a meeting support application is installed, a display that displays a meeting screen such as a material to be used in the meeting, and a communication medium that can communicate with the user terminal (for example, a communication tag) are disposed in the meeting room. In addition, the meeting system includes a management server that manages information on meetings, meeting rooms, and devices to be used for the meetings.

Meeting System 100

Figure 1:
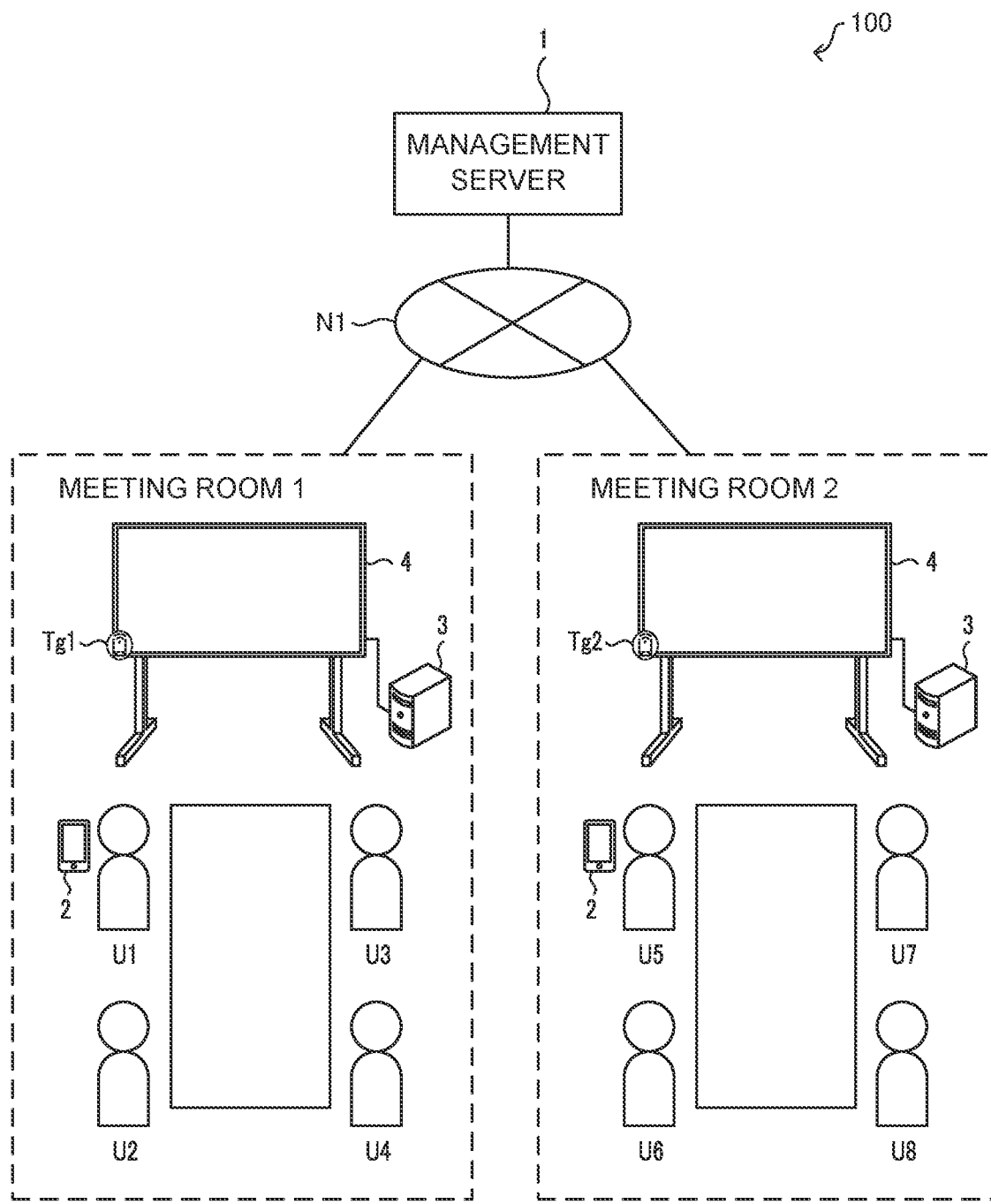
FIG. 1 is a schematic diagram illustrating a schematic configuration of a meeting system according to an embodiment of the present disclosure.

FIG. 1 is a diagram illustrating a schematic configuration of a meeting system 100 according to an embodiment of the present disclosure. The meeting system 100 includes a management server 1, user terminals 2, meeting room terminals 3, displays 4, and communication tags Tg. FIG. 1 illustrates a meeting room 1 and a meeting room 2. Herein, an example in which users U1, U2, U3 and U4 participate in a meeting in the meeting room 1 and, users U5, U6, U7 and U8 participate in a meeting in the meeting room 2, the meeting room 1 and the meeting room 2 are connected, and an online meeting is held, is illustrated. In meeting room 1, the user terminal 2 which is owned by the user U1, the meeting room terminal 3, the display 4, and the communication tag Tg1 are disposed. In the meeting room 2, the user terminal 2 owned by the user U5, the meeting room terminal 3, the display 4, and the communication tag Tg2 are disposed. The meeting system 100 enables online meetings in the meeting room 1 and the meeting room 2 by executing a meeting support application installed in the meeting room terminal 3 in the meeting room 1 and a meeting support application installed in the meeting room terminal 3 in the meeting room 2. The meeting system 100 has a microphone, a speaker, and a camera connected to each meeting room terminal 3, and is configured to enable bidirectional communication of voice and a camera image.

The management server 1 is constructed, for example, with one or a plurality of server devices (e.g., virtual servers). The user terminal 2 may be a terminal device (e.g., a smartphone) that a user who participates in the meeting brings into the meeting room. Herein, for example, the representative user U1 who participates in the meeting in the meeting room 1 brings the user terminal 2, and the representative user U5 who participates in the meeting in the meeting room 2 brings the user terminal 2. In each meeting room, each user may have a user terminal 2.

The management server 1, the user terminal 2, and the meeting room terminal 3 are connected to each other via a network N1. The network N1 is a communication network such as the Internet, a LAN, a WAN, and a public telephone line. In addition, the meeting room terminal 3 and the display 4 are connected by a wired LAN or a wireless LAN. The user terminal 2 and the communication tag Tg can be connected by short-range wireless communication. The communication tag Tg is installed in the meeting room. For example, the communication tag Tg1 for the meeting room 1 is attached to a housing (outer frame) of the display 4 in the meeting room 1, and the communication tag Tg2 for the meeting room 2 is attached to a housing (outer frame) of the display 4 in meeting room 2. The communication medium of the present disclosure is not limited to the communication tag Tg, but may be a one-dimensional code, a two-dimensional code, or the like. For example, an image of a two-dimensional code for the meeting room 1 is displayed on the display 4 in the meeting room 1, and an image of a two-dimensional code for the meeting room 2 may be displayed on the display 4 in the meeting room 2. Medium information in the present disclosure may be a tag ID of a communication tag Tg or a two-dimensional code image of a two-dimensional code.

Management Server 1

Figure 2:
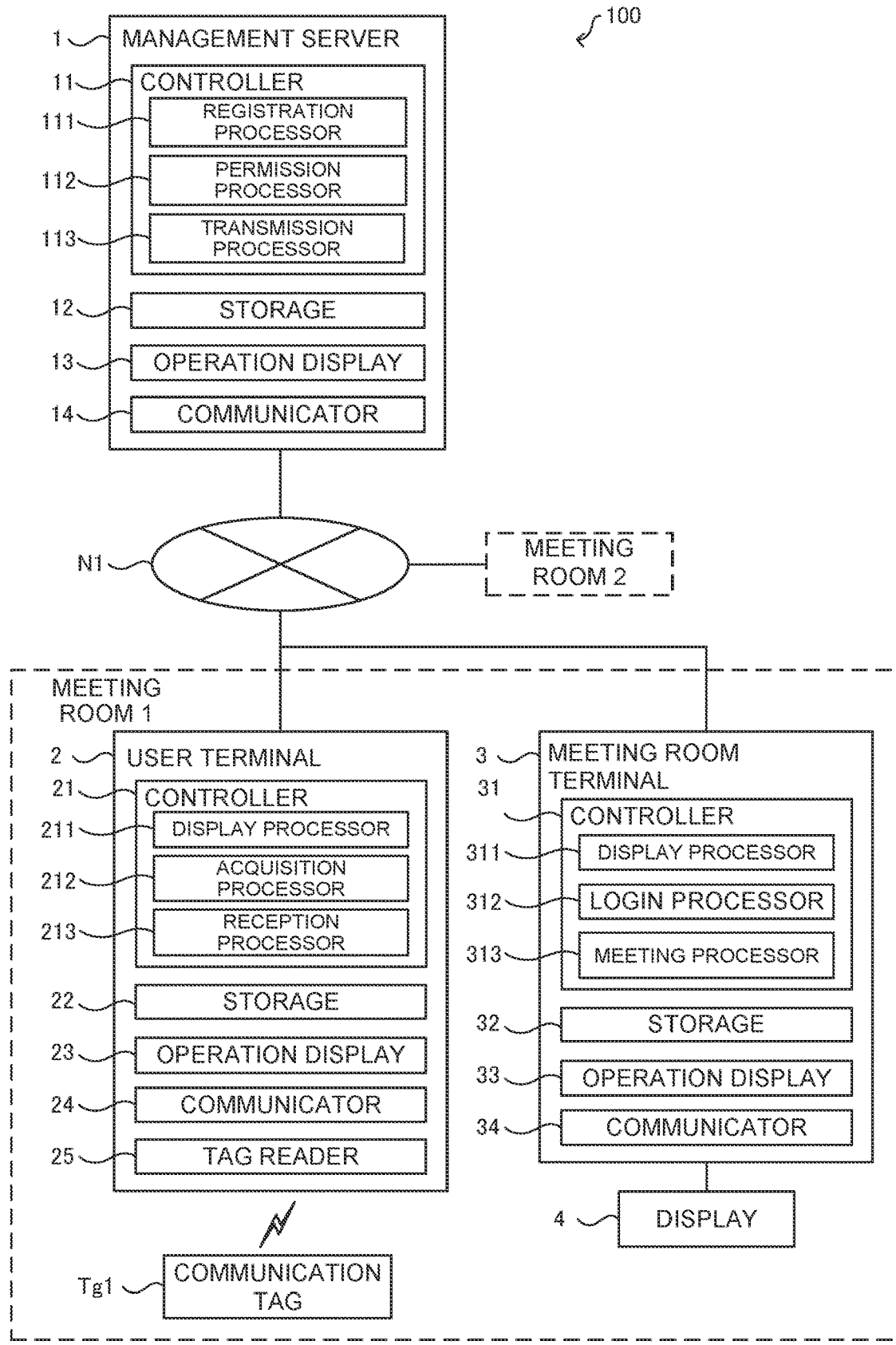
FIG. 2 is a functional block diagram illustrating a configuration of the meeting system according to the embodiment of the present disclosure.

As illustrated in FIG. 2, the management server 1 includes a controller 11, a storage 12, an operation display 13, a communicator 14, and the like. The management server 1 may be one or a plurality of virtual servers (cloud servers) or may be one or a plurality of physical servers.

The communicator 14 connects the management server 1 to the network N1 by a wired or wireless manner, and is a communicator for executing data communication according to a predetermined communication protocol with other device (e.g., the user terminal 2, or the meeting room terminal 3) via the network N1.

The operation display 13 is a user interface including: a display, such as a liquid crystal display and an organic EL display, which displays various kinds of information; and an operation acceptor, such as a mouse, a keyboard, and a touch panel, which receives an operation. The operation display 13 receives, for example, an operation of an administrator of the management server 1.

The storage 12 is a non-volatile storage, such as a hard disk drive (HDD), a solid state drive (SSD), and a flash memory, which stores various kinds of information. The storage 12 stores control programs such as a meeting support program to cause the controller 11 to execute a meeting support process (see FIG. 13) described below. For example, the meeting support program is recorded on a computer-readable recording medium such as a CD and a DVD in a non-transitory manner, is read by a reading device (not illustrated) such as a CD drive and a DVD drive included in the management server 1, and is stored in the storage 12. The meeting support program may be distributed from a cloud server and stored in the storage 12.

In addition, the storage 12 stores management tables including various kinds of information for supporting meetings. Specifically, the storage 12 stores a meeting reservation information management table T1 that manages meeting information related to meeting reservation, a meeting room information management table T2 that manages meeting room information related to meeting rooms, a device information management table T3 that manages device information related to devices installed in the meeting room, a user information management table T4 that manages user information related to users, and other data are stored.

FIG. 3 is a diagram illustrating an example of the meeting reservation information management table T1. In the meeting reservation information management table T1, meeting information, in which a meeting date, a meeting time, a meeting room ID, a meeting name, a reserving person's ID, a meeting URL, an attendance, an attached material, and the like are associated with each other for each meeting, is registered. The meeting room ID is identification information of a meeting room where a meeting is held (an example of meeting room identification information of the present disclosure). The reserving person's ID is identification information that identifies a user who reserves a meeting (an example of user information of the present disclosure). The meeting URL is access information (connection information) for connecting when a meeting is started. For example, a meeting support application accesses the meeting URL to start an online meeting application (e.g., a general-purpose meeting application) corresponding to the meeting URL to connect to the destination ID (meeting ID). The attached material is a material used for a meeting. For example, when a meeting is determined to be held, a reserving person operates his/her own PC (e.g., the user terminal 2) to execute a reservation operation of inputting meeting information including each of the aforementioned pieces of information. The controller 11 registers the aforementioned meeting information in the meeting reservation information management table T1 in response to the reservation operation of the user. A function for managing the meeting reservation information including the above meeting information may not be included in the management server 1. For example, in a case where an external server different from the management server 1 provides a service (e.g., a calendar service) to manage the meeting reservation information, the management server 1 may access the external server, refer to the meeting reservation information, and acquire the meeting information corresponding to the meeting room ID and the reserving person's ID.

FIG. 4 is a diagram illustrating an example of the meeting room information management table T2. In the meeting room information management table T2, meeting room information, in which a tag ID, a meeting room ID, a meeting room name, a meeting room terminal ID, a device ID, and the like are associated with each other for each meeting room, is registered. The tag ID is identification information of the communication tag Tg installed in the meeting room (an example of medium information or media identification information of the present disclosure). The meeting room terminal ID is identification information of the meeting room terminal 3 installed in the meeting room. The device ID is identification information of a device (such as the display 4, a screen sharing device, a printer, a lighting, an air cleaner, and an air conditioner) installed in the meeting room. In the meeting room information management table T2, the meeting room information for each meeting room is registered in advance by the administrator or other person through a registration operation.

In the example illustrated in FIG. 4, the tag ID "N001" is the identification of the communication tag Tg1 installed in the meeting room 1, and the tag ID "N002" is the identification information of the communication tag Tg2 installed in the meeting room 2". In addition, the meeting room terminal ID "PC0001" is the identification information of the meeting room terminal 3 installed in the meeting room 1, and the meeting room terminal ID "PC0002" is the identification information of the meeting room terminal 3 installed in the meeting room 2. The device ID "D0011" is the identification information of the display 4 installed in the meeting room 1, and the device ID "D0021" is the identification information of the display 4 installed in the meeting room 2.

FIG. 5 is a diagram illustrating an example of the device information management table T3. In the device information management table T3, device information, in which a device ID, a device name, an IP address, and the like are associated with each other for each device installed in a meeting room, is registered. In the device information management table T3, the device information for each device is registered in advance by an administrator or other person through a registration operation.

Figure 9:
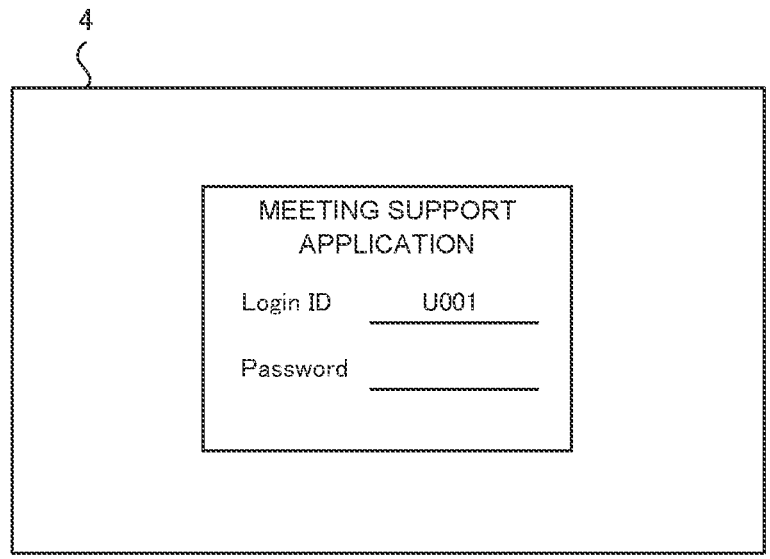
FIG. 9 is a diagram illustrating an example of a login screen of the meeting support application displayed on a display according to the embodiment of the present disclosure.

FIG. 6 is a diagram illustrating an example of the user information management table T4. In the user information management table T4, user information, in which a user ID, a user name, an authentication information, and the like are associated with each other for each user, is registered. The user ID and the authentication information (password, authentication token, or the like) is used as login information at the time of login to the meeting support application (see FIG. 9). In the user information management table T4, the user information for each user is registered in advance by a user registration operation.

Some or all of the meeting reservation information management table T1, the meeting room information management table T2, the device information management table T3, and the user information management table T4 may be stored in a server accessible from the management server 1.

The controller 11 has control devices such as a CPU, a ROM, and a RAM. The CPU is a processor that executes various types of arithmetic processes. The ROM stores in advance control programs such as a BIOS and an OS for causing the CPU to execute various types of processes. The RAM stores various kinds of information and is used as a temporary storage memory (work area) for the various processes executed by the CPU. The controller 11 controls the management server 1 by causing the CPU to execute various types of control programs stored in advance in the ROM or the storage 12.

Specifically, the controller 11 includes various processors such as a registration processor 111, a permission processor 112, and a transmission processor 113. The controller 11 executes various processes in accordance with the meeting support program to function as various processors described above. All or some of the processors included in the controller 11 may be configured by an electronic circuit. The meeting support program may be a program for causing a plurality of processors to function as various processors described above.

The registration processor ill registers the meeting reservation information management table T1 (see FIG. 3), the meeting room information management table T2 (see FIG. 4), the device information management table T3 (see FIG. 5), and the user information management table T4 (see FIG. 6). For example, when a user makes a meeting reservation using the user terminal 2, the registration processor 111 registers the meeting information in the meeting reservation information management table T1.

The permission processor 112 permits login to the meeting support application for conducting an online meeting. Specifically, the permission processor 112 identifies the meeting in which the user participates on the basis of the user information and the tag ID acquired from the user terminal 2, and permits login to the meeting support application for the identified meeting. In a case where the permission processor 112 permits the user to log in, the permission processor 112 transmits the login permission information, the meeting information of the identified meeting, and the meeting room information corresponding to the meeting room ID associated with the tag ID to the user terminal 2 of the user.

For example, the permission processor 112 refers to the meeting room information management table T2 (see FIG. 4) to identify the meeting room corresponding to the tag ID acquired from the user terminal 2. For example, when the user U1 brings the user terminal 2 close to the communication tag Tg1 installed in the meeting room 1, the user terminal 2 communicates with the communication tag Tg1 and reads the tag ID "N001". When the permission processor 112 acquires the tag ID "N001" from the user terminal 2, the permission processor 112 refers to the meeting room information management table T2 (see FIG. 4) and acquires the meeting room ID "R0001" corresponding to the tag ID "N001". In addition, the permission processor 112 identifies a meeting corresponding to the meeting room ID "R0001" from the meeting reservation information management table T1 (see FIG. 3), and acquires the meeting information. Herein, the permission processor 112 acquires meeting information of meetings to be held on a current day (in this case, "Apr. 10, 2021"), the meetings (a "regular meeting" and a "budget meeting") being corresponding to the meeting room ID "R0001". The permission processor 112 transmits the login permission information, the meeting information of the identified meetings (the "regular meeting" and the "budget meeting"), and the meeting room information corresponding to the meeting room ID "R0001" to the user terminal 2 of the user U1.

Figure 8:
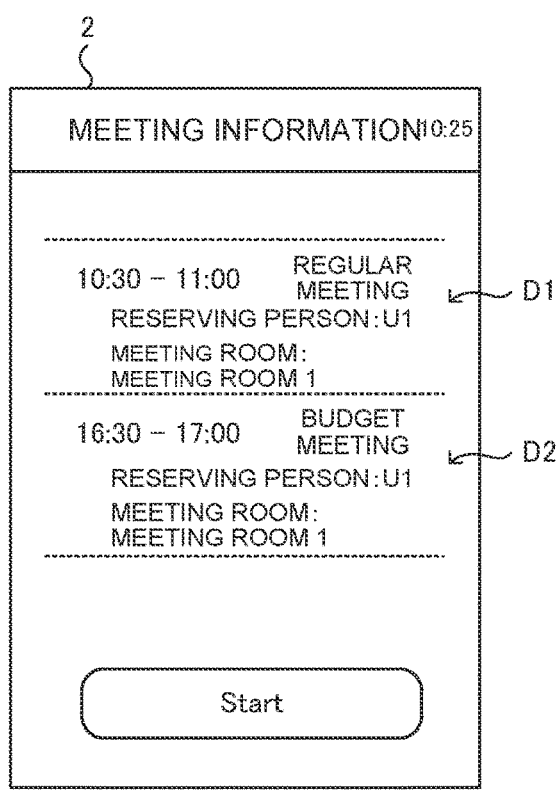
FIG. 8 is a diagram illustrating an example of a meeting information screen of a user terminal according to the embodiment of the present disclosure.

The transmission processor 113 transmits the meeting information, the meeting room information, and the user information specified by the user from among a plurality of pieces of meeting information displayed on the user terminal 2 to the meeting room terminal 3. For example, as illustrated in FIG. 8, in a case where, among the meeting information D1 of the "regular meeting" and the meeting information D2 of the "budget meeting" displayed on the user terminal 2, the user U1 specifies the meeting information D1 of the "regular meeting", the transmission processor 113 transmits, to the meeting room terminal 3 installed in the meeting room 1 corresponding to the meeting room ID "R0001", the meeting information D1 of the "regular meeting", the meeting room information corresponding to the meeting room ID "R0001", and the user information of the user U1.

User Terminal 2

As illustrated in FIG. 2, the user terminal 2 includes a controller 21, a storage 22, an operation display 23, a communicator 24, and a tag reader 25. The user terminal 2 is an information processing device (e.g., a portable terminal) such as a smartphone, a cell phone, a tablet terminal, and a personal computer (PC). FIG. 2 illustrates an example of the user terminal 2 of the user U1 (see FIG. 1) who participates in a meeting in the meeting room 1.

The tag reader 25 communicates with the communication tag Tg1 to read the tag ID. For example, the tag reader 25 communicates data with the communication tag Tg1 via short-range wireless communication. As another embodiment, for example, in a case where a two-dimensional code is installed in the meeting room 1 instead of the communication tag Tg1, a camera mounted on the user terminal 2 may read the two-dimensional code.

The communicator 24 is a communicator that connects the user terminal 2 to the network N1 by a wired or wireless manner, and executes data communication according to a predetermined communication protocol with other devices (e.g., the management server 1, and the meeting room terminal 3) via the network N1.

The operation display 23 is a user interface including: a display, such as a liquid crystal display and an organic EL display, which displays various kinds of information; and an operation acceptor, such as a mouse, a keyboard, and a touch panel, which receives an operation. The operation display 23 receives, for example, an operation of the user U1 of the user terminal 2.

The storage 22 is a non-volatile storage, such as an HDD, an SSD, and a flash storage, which stores various kinds of information. The storage 22 stores control programs such as a meeting support program to cause the controller 21 to execute the meeting support process (see FIG. 12) described below. For example, the meeting support program is recorded on a computer-readable recording medium such as a CD and a DVD in a non-transitory manner, is read by a reading device (not illustrated) such as a CD drive and a DVD drive included in the user terminal 2, and is stored in the storage 22. The meeting support program may be distributed from a cloud server and stored in the storage 22.

The controller 21 has control devices such as a CPU, a ROM, and a RAM. The CPU is a processor that executes various types of arithmetic processes. The ROM stores in advance control programs such as a BIOS and an OS for causing the CPU to execute various types of processes. The RAM stores various kinds of information and is used as a temporary storage memory (work area) for the various processes executed by the CPU. The controller 21 controls the user terminal 2 by causing the CPU to execute various types of control programs stored in advance in the ROM or the storage 22.

Specifically, the controller 21 includes various processors such as a display processor 211, an acquisition processor 212, and a reception processor 213. The controller 21 executes various processes in accordance with the control program with the CPU to function as various processors described above. All or some of the processors included in the controller 21 may be configured by an electronic circuit. The control program may be a program for causing a plurality of processors to function as various processors described above.

Figure 7:
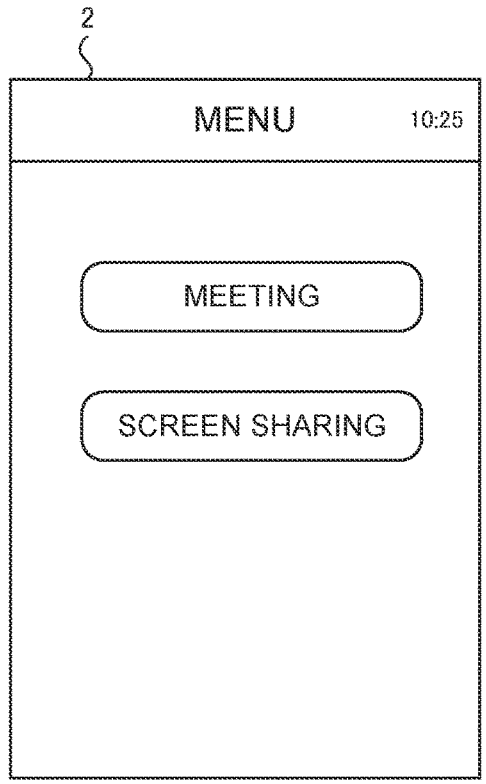
FIG. 7 is a diagram illustrating an example of a menu screen of a meeting support application according to the embodiment of the present disclosure.
Figure 10:
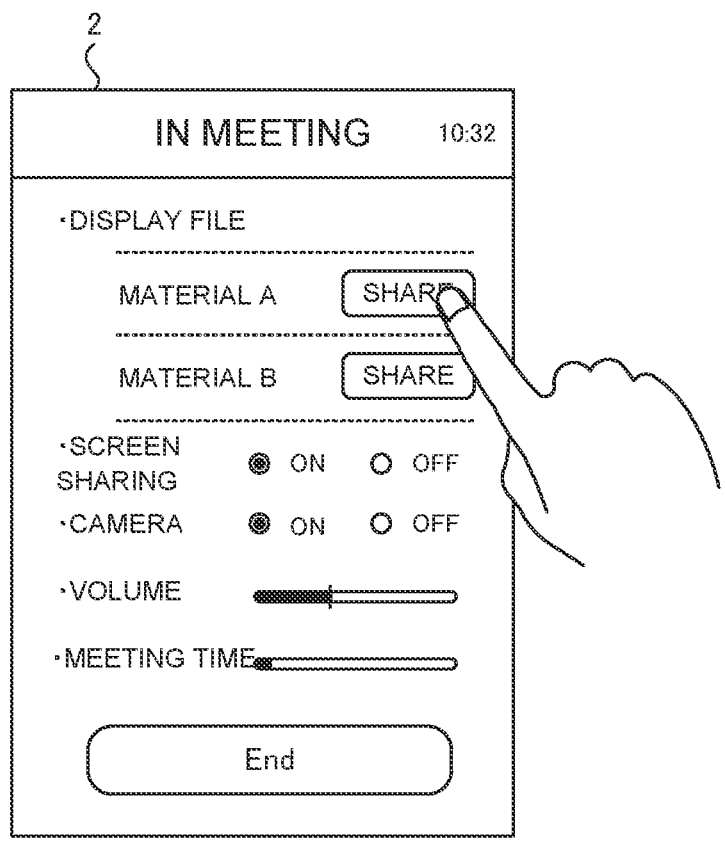
FIG. 10 is a diagram illustrating an example of an operation screen of the user terminal according to the embodiment of the present disclosure.

The display processor 211 displays various kind of information on the operation display 23. For example, the display processor 211 displays various screens, such as the menu screen of the aforementioned meeting support application (see FIG. 7), the meeting information screen that displays meeting information to be acquired from the management server 1 (see FIG. 8), an operation screen that receives a user setting operation in a meeting (see FIG. 10), and other various screens.

The user terminal 2 communicates with the communication tag Tg installed in the meeting room, so that the acquisition processor 212 acquires the tag ID corresponding to this communication tag Tg. Herein, the acquisition processor 212 acquires the tag ID "N001" corresponding to the communication tag Tg1, the tag ID "N001" being read by the tag reader 25 through communication between the tag reader 25 and the communication tag Tg1 installed in the meeting room 1.

When the acquisition processor 212 acquires the tag ID, the acquisition processor 212 transmits the tag ID and the user information of the user terminal 2 to the management server 1. Herein, the acquisition processor 212 transmits the tag ID "N001", and the user ID "U001" and the authentication information "token-u1" of the user U1 (see FIG. 6) to the management server 1.

Herein, the permission processor 112 of the management server 1 identifies a meeting in which the user participates, on the basis of the user information and the tag ID acquired from the user terminal 2, and permits login to a meeting support application of the identified meeting. For example, the permission processor 112 refers to the meeting room information management table T2 (see FIG. 4) and acquires the meeting room ID "R0001" corresponding to the tag ID "N001" acquired from the user terminal 2. The permission processor 112 acquires meeting information of the meetings (the "regular meeting" and the "budget meeting") corresponding to the meeting room ID "R0001" from the meeting reservation information management table T1 (see FIG. 3). The permission processor 112 transmits the login permission information, the meeting information of the identified meetings (the "regular meeting" and the "budget meeting"), and the meeting room information corresponding to the meeting room ID "R0001" to the user terminal 2 of the user U1.

When the display processor 211 of the user terminal 2 acquires the meeting information from the management server 1, the meeting information screen including the meeting information D1 of the "regular meeting" and the meeting information D2 of the "budget meeting" is displayed as illustrated in FIG. 8.

The reception processor 213 receives various operations from the user. For example, the reception processor 213 receives a menu selection operation on the menu screen illustrated in FIG. 7. For example, the user U1 selects a "meeting" menu button when holding a meeting. In addition, the user U1 selects a "screen sharing" menu button when the user U1 intends to display the screen of user terminal 2 on the display 4 installed in the meeting room 1.

On the meeting information screen illustrated in FIG. 8, the reception processor 213 receives an operation in which the user U1 specifies either the meeting information D1 or the meeting information D2. For example, the user U1 selects the meeting information of the meeting to be started now (in this case, the meeting information D1 of the "regular meeting") and presses a "Start" button. The reception processor 213 transmits the meeting information D1 specified by the user U1 to the management server 1, and the management server 1 receives the meeting information D1. When receiving the meeting information D1, the transmission processor 113 of the management server 1 transmits the meeting information D1, and the meeting room information corresponding to the meeting room ID "R0001", and the user information of the user U1 to the meeting room terminal 3 of the meeting room 1.

When login to the meeting support application of the meeting is permitted, and the meeting is started, the reception processor 213 receives a display instruction for a material usable for the meeting from the user U1. When the reception processor 213 receives the display instruction, the reception processor 213 transmits the display instruction for the material to the meeting room terminal 3 of the meeting room 1. When the meeting room terminal 3 receives a display instruction for a material A from the user terminal 2, for example, the meeting room terminal 3 displays the material A on the meeting support application screen of the display 4 illustrated in FIG. 11, for example. The meeting support application displays the material A on the display 4 of the meeting room 2 via the meeting room terminal 3 of the meeting room 2.

The reception processor 213 receives various control instructions from the user U1 during the meeting. For example, the reception processor 213 receives control instructions related to various applications controlled by the meeting support application (such as screen sharing, a camera, and volume of the online meeting application) (see FIG. 10). In addition, the reception processor 213 receives control instructions related to the devices installed in the meeting room 1 (the display 4, a screen sharing device, a printer, a lighting, an air cleaner, an air conditioner, and the like). The controller 21 executes various control processes on the basis of control instructions received by the reception processor 213.

The reception processor 213 receives an end instruction of the meeting from the user U1. When the reception processor 213 receives the end instruction of the meeting from the user U1, the reception processor 213 transmits the meeting end instruction to the meeting room terminal 3. When the meeting room terminal 3 receives the meeting end instruction from the user terminal 2, the meeting room terminal 3 ends the meeting and logoff from the meeting support application is executed.

Meeting Room Terminal 3

As illustrated in FIG. 2, the meeting room terminal 3 includes a controller 31, a storage 32, an operation acceptor 33, a communicator 34, and the like. The meeting room terminal 3 is an information processing device such as a personal computer (PC). FIG. 2 illustrates an example of the meeting room terminal 3 installed in the meeting room 1. To the meeting room terminal 3, the display 4 is connected by, for example, a wired LAN.

The communicator 34 is a communicator that connects the meeting room terminal 3 to the network N1 by a wired or wireless manner, and executes data communication according to a predetermined communication protocol with other devices (e.g., the management server 1, and the user terminal 2) via the network N1.

The operation acceptor 33 is composed of a mouse, a keyboard, a touch panel, and the like, and receives an operation by the users U1 to U4 located in the meeting room 1, for example.

The storage 32 is a non-volatile storage, such as an HDD, an SSD, and a flash memory, which stores various kinds of information. The storage 32 stores control programs such as a meeting support program to cause the controller 31 to execute a meeting support process (see FIG. 14) described below. For example, the meeting support program is recorded on a computer-readable recording medium such as a CD and a DVD in a non-transitory manner, is read by a reading device (not illustrated) such as a CD drive and a DVD drive included in the meeting room terminal 3, and is stored in the storage 32. The meeting support program may be distributed from a cloud server and stored in the storage 32.

The controller 31 has control devices such as a CPU, a ROM, and a RAM. The CPU is a processor that executes various types of arithmetic processes. The ROM stores in advance control programs such as a BIOS and an OS for causing the CPU to execute various types of processes. The RAM stores various kinds of information and is used as a temporary storage memory (work area) for the various processes executed by the CPU. The controller 31 controls the meeting room terminal 3 by causing the CPU to execute various types of control programs stored in advance in the ROM or the storage 32.

Specifically, the controller 31 includes various processors such as a display processor 311, a login processor 312, and a meeting processor 313. The controller 31 executes various processes in accordance with the control program with the CPU to function as various processors described above. All or some of the processors included in the controller 31 may be configured by an electronic circuit. The control program may be a program for causing a plurality of processors to function as various processors described above.

The display processor 311 displays various kind of information on the display 4. For example, the display processor 311 displays a meeting schedule received from the management server 1 on the display 4. For example, when the management server 1 transmits a meeting schedule for a meeting scheduled to be held in the meeting room 1 on a current day to the meeting room terminal 3, the display processor 311 of the meeting room terminal 3 displays the meeting schedule received from the management server 1 on the display 4.

When the meeting is started, the display processor 311 displays various meeting support application screens on the display 4. For example, when the display processor 311 receives a display instruction for a material usable A for the meeting from the user terminal 2, the display processor 311 displays the material A on the meeting support application screen of the display 4 (see FIG. 11).

In a case where login to the meeting support application of the meeting is permitted by the permission processor 112 of the management server 1, the login processor 312 executes a login process to the meeting support application on the basis of user information. Specifically, the management server 1 permits login to the meeting support application, and the meeting information D1 of the meeting specified by the user U1 ("regular meeting"), the meeting room information of the meeting room 1, and the user information (user ID "U001" and authentication information "token-u1") to the meeting room terminal 3, the login processor 312 starts the meeting support application and executes the login process by using the user information (see FIG. 9). The display processor 311 may not display the login screen illustrated in FIG. 9 on the display 4.

When the login process by the login processor 312 is executed, the meeting by the meeting support application is started. In this embodiment, the management server 1 transmits the meeting information D1, the meeting room information, and the user information to the meeting room terminal 3 after approval of the user information corresponding to the meeting, and therefore the meeting is automatically started by execution of the login process by using this user information by the login processor 312. Thus, the user can start the meeting without executing any login operation.

When the meeting is started, the meeting processor 313 receives, from a user, control instructions (see FIG. 10) related to various applications to be controlled by the meeting support applications from the user, and executes the control. For example, the meeting processor 313 executes processes such as changing the display file, ON/OFF of screen sharing on the online meeting application, ON/OFF of the camera, volume adjustment, meeting end, and other processes.

Figure 11:
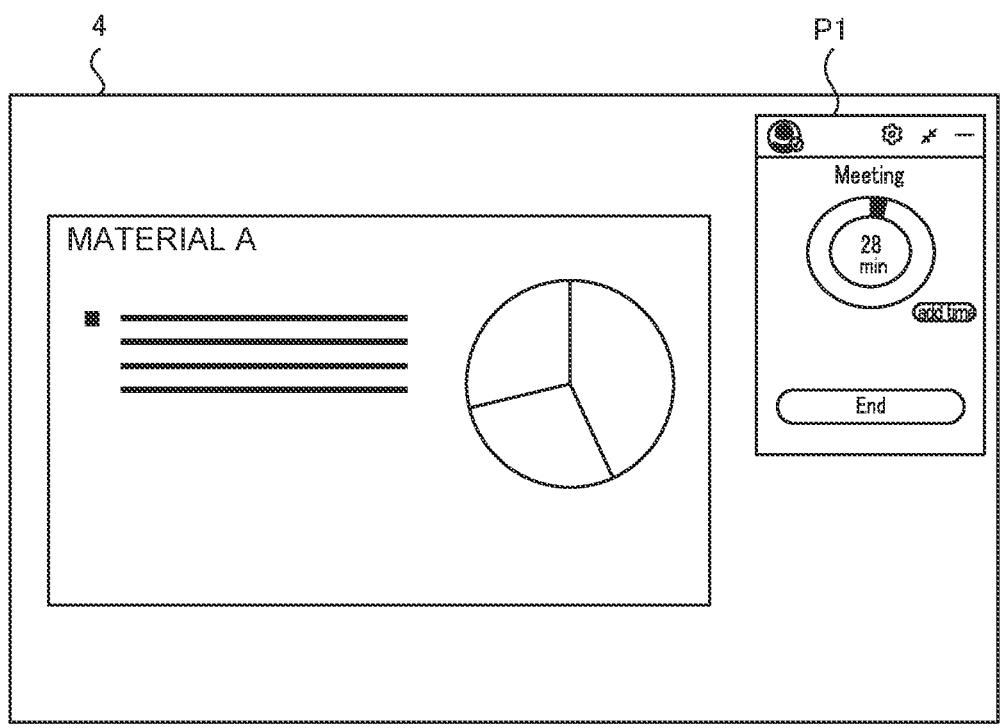
FIG. 11 is a diagram illustrating an example of a meeting support application screen displayed on the display according to the embodiment of the present disclosure.

In addition, during the meeting, the meeting processor 313 displays a meeting support screen P1 on the meeting support application screen illustrated in FIG. 11. The meeting processor 313 displays the progress of the meeting, the time remaining until the end time of the meeting, and other information on the meeting support screen P1. In addition, the meeting processor 313 receives various setting operations from the user, or receives a meeting extension instruction on the meeting support screen P1.

Meeting Support Process

In the following, an example of a procedure of the meeting support process executed in the meeting system 100 will be described with reference to FIG. 12, FIG. 13, and FIG. 14.

The present disclosure can be viewed as the invention of a meeting support method (an example of a meeting support method of the present disclosure) in which one or a plurality of steps included in the meeting support process are performed. The one or a plurality of steps that are included in the meeting support process described herein may appropriately be omitted. In addition, an execution order of the steps in the meeting support process may be different as long as the same or similar operational effects are exerted.

Furthermore, a case where the controller 11 of the management server 1, the controller 21 of the user terminal 2, and the controller 31 of the meeting room terminal 3 execute respective steps in the aforementioned meeting support process will be described as an example, but in other embodiment, one or a plurality of processors may execute respective steps in the aforementioned meeting support process in a distributed manner.

FIG. 12 illustrates an example of the procedure of the meeting support process executed by the controller 21 of the user terminal 2, FIG. 13 illustrates an example of the procedure of the meeting support process executed by the controller 11 of the management server 1, and FIG. 14 illustrates an example of the procedure of the meeting support process executed by the controller 31 of the meeting room terminal 3.

Meeting Support Process in User Terminal 2

In Step S1 illustrated in FIG. 12, the controller 21 of the user terminal 2 determines whether or not the tag ID is read. For example, when the user U1 brings the user terminal 2 closer to the communication tag Tg 1 (see FIG. 1) attached to the display 4 in the meeting room 1, the tag reader 25 of the user terminal 2 communicates with the communication tag Tg1, so that the controller 21 acquires the tag ID "N001".

Next, in Step S2, the controller 21 transmits the acquired tag ID and the user information to the management server 1. Herein, the controller 21 transmits the tag ID "N001", the user ID "U001" of the user U1, and the authentication information "token-u1" (see FIG. 6) to the management server 1.

Next, in Step S3, the controller 21 determines whether or not the login permission information is received from the management server 1. In a case where the controller 21 receives the login permission information (S3: Yes), the process proceeds to Step S4. On the other hand, in a case where the controller 21 does not receive the login permission information (S3: No), the process ends. For example, in a case where the meeting information of the meeting in which the user U1 participates in the meeting room 1 associated with the tag ID "N001" is registered (reserved) in the meeting reservation information management table T1 (see FIG. 3), the controller 31 of the management server 1 transmits the login permission information to the user terminal 2. In a case where the meeting information is not registered in the meeting reservation information management table T1, the controller 31 of the management server 1 does not transmit the login permission information to the user terminal 2 or transmits the login non-permission information (login rejection information) to the user terminal 2.

In Step S4, the controller 21 acquires the meeting information and the meeting room information from the management server 1. Herein, the controller 21 acquires the meeting room information of the meeting room ID "R0001"

corresponding to the tag ID "N001" (see FIG. 4) and, the meeting information of the "regular meeting" and the "budget meeting" associated with the meeting room ID "R0001" (see FIG. 3) from the management server 1.

The controller 21 displays the meeting information acquired from the management server 1 on the operation display 23 (see FIG. 8). In addition, the controller 21 receives an operation in which the user U1 specifies either the meeting information D1 or the meeting information D2, on the meeting information screen illustrated in FIG. 8.

Next, in Step S5, the controller 21 transmits the meeting information of the meeting specified by user U1 to the management server 1. Herein, the user U1 specifies the meeting information D1 for the "regular meeting" to be started now. When the user U1 specifies a meeting, the management server 1 transmits the meeting information, the meeting room information, and the user information related to the meeting to the meeting room terminal 3 at the location where the meeting is held (meeting room 1). The meeting room terminal 3 starts the meeting by logging into the meeting support application using the aforementioned user information.

When the meeting is started, the controller 21 transmits a display instruction for a material (e.g., the material A) to be used for the meeting to the meeting room terminal 3, in Step S6. The controller 31 of the meeting room terminal 3 displays the material A on the display 4 on the basis of the above display instruction (see FIG. 11).

Next, in Step S7, the controller 21 displays an operation screen (see FIG. 10) which is to receive a setting operation of the user U1 in the meeting on the operation display 23.

Next, in Step S8, the controller 21 determines whether or not the control instruction by the user U1 is received. For example, the controller 21 receives control instructions related to various operations (such as screen sharing, a camera, and volume) included in the online meeting application controlled by the meeting support application, control instructions related to the devices installed in the meeting room 1 (the display 4, the screen sharing device, the printer, the lighting, the air cleaner, the air conditioner, and the like). When the controller 21 receives the control instruction from the user U1 (S8: Yes), the process proceeds to Step S9. On the other hand, in a case where the controller 21 does not receive the control instruction from the user U1 (S8: No), the process proceeds to Step S10.

In Step S9, the controller 21 executes the control process according to the above control instruction. For example, the controller 21 sets the screen sharing having the online meeting application controlled by the meeting support application to ON. For example, the controller 21 causes the printer (not illustrated) installed in the meeting room 1 to execute a process of printing a material.

In Step S10, the controller 21 determines whether or not an operation to end the meeting is received. For example, when the user U1 presses an end ("End") button on the operation screen (see FIG. 10), the controller 21 receives the meeting end operation. When the controller 21 receives the meeting end operation, the controller 21 transmits a meeting end instruction to the meeting room terminal 3.

The controller 21 of the user terminal 2 executes the aforementioned meeting support process as described above.

Meeting Support Process in Management Server 1

In Step S21 illustrated in FIG. 13, the controller 11 of the management server 1 determines whether or not the tag ID and user information are received from the user terminal 2. Herein, the controller 11 receives the tag ID "N001", the user ID "U001" and the authentication information "token-u1" from the user terminal 2 of the user U1.

Next, in Step S22, the controller 11 identifies the meeting room corresponding to the tag ID. Specifically, the controller 11 refers to the meeting room information management table T2 (see FIG. 4) to identify the meeting room 2 corresponding to the tag ID "N001" acquired from the user terminal 2, and acquires the meeting room ID "R0001" corresponding to the meeting room 2.

Next, in Step S23, the controller 11 determines whether or not the meeting information for the meeting that the user U1 is scheduled to attend is registered (reserved) in the meeting reservation information management table T1 (see FIG. 3). In a case where the meeting information is registered in the meeting reservation information management table T1 (S23: Yes), the process proceeds to Step S24. On the other hand, in a case where the meeting information is not registered in the meeting reservation information management table T1 (S23: No), the process is ended.

In Step S24, the controller 11 transmits the login permission information to the user terminal 2 of the user U1. In Step S25, the controller 11 also transmits the meeting information and the meeting room information to the user terminal 2 of user U1. Herein, the controller 11 transmits the meeting room information of the meeting room ID "R0001" corresponding to the tag ID "N001" (see FIG. 4), and the meeting information of the "regular meeting" and the "budget meeting" associated with the meeting room ID "R0001" (see FIG. 3) to the user terminal 2 of the user U1.

Next, in Step S26, the controller 11 receives the meeting information of the meeting specified by the user U1 from the user terminal 2. Herein, the controller 11 receives the meeting information D1 for the "regular meeting" specified by the user U1 (see Step S5 in FIG. 12).

Next, in Step S27, the controller 11 transmits the meeting information, the meeting room information, and the user information related to the meeting specified by the user U1 to the meeting room terminal 3 at the location (meeting room 1) where the meeting is held.

The controller 11 of the management server 1 executes the aforementioned meeting support process as described above.

Meeting Support Process in Meeting Room Terminal 3

In Step S31 illustrated in FIG. 14, the controller 31 of the meeting room terminal 3 determines whether or not the meeting information, the meeting room information, and the user information are received from the management server 1. Herein, the controller 31 receives the meeting information related to the "regular meeting" specified by the user U1, and the meeting room information of the meeting room 2, and the user information (the user ID "U001" and the authentication information "token-u1").

Next, in Step S32, the controller 31 starts the meeting support application. Next, in Step S33, the controller 31 executes the login process to the meeting support application on the basis of the aforementioned user information. For example, the controller 31 executes the login process using the user ID "U001" and the authentication information "token-u1" (see FIG. 9). The controller 31 may execute the login process without displaying the login screen illustrated in FIG. 9 on display 4. Consequently, it is possible to prevent leakage of personal information due to display of the aforementioned user information on the display 4.

Next, in Step S34, the controller 31 starts an online meeting using the meeting support application. Specifically, in Step S35, the controller 31 displays the meeting material (material A in this case) on the display 4 on the basis of the display instruction (see Step S6 in FIG. 12) received from the user terminal 2 (see FIG. 11). In the meeting support application screen illustrated in FIG. 11, the controller 31 displays the meeting support screen P1. The controller 31 also transmits and receives voice, video, and a display screen by connection to the meeting room terminal 3 in the meeting room 2.

Next, in Step S36, the controller 31 determines whether or not a control instruction is received from the user terminal 2 (see Step S9 in FIG. 12). When the controller 31 receives the control instruction from the user terminal 2, the controller 31 executes the control process according to the control instruction in Step S37. For example, when the controller 31 receives an instruction to perform screen sharing of a material B from the user terminal 2, the controller 31 displays the material B on the display 4.

Next, in Step S38, the controller 31 determines whether or not the meeting end instruction (see Step S11 in FIG. 12) is received from the user terminal 2. When the controller 31 receives the meeting end instruction from the user terminal 2, the controller 31 ends the meeting (S39). The controller 31 repeats the process of Steps S36 to S37 until the meeting end instruction is received from the user terminal 2 (S38: No).

Finally, in Step S40, the controller 11 logs off from the meeting support application.

The controller 31 of the meeting room terminal 3 executes the aforementioned meeting support process as described above.

As described above, the meeting system 100 is a system which identifies a user location (meeting room) and a meeting under a condition that the user terminal 2 reads the communication tag Tg installed in the meeting room, which permits login of the meeting support application for that meeting, and which starts the meeting.

Specifically, the meeting system 100 in this embodiment includes the user terminal 2 for a user who participates in a meeting in a meeting room, the management server 1 that manages meeting reservation information and meeting room information related to meeting rooms, and executes the meeting support application. The user terminal 2 communicates with the communication tag Tg installed in the meeting room, the meeting system 100 acquires the tag ID corresponding to this communication tag Tg, identifies the meeting in which the user participates, on the basis of the user information and the tag ID acquired from the user terminal 2, and permits login to the meeting support application of the identified meeting.

Consequently, the user who participates in the meeting can start the meeting using the meeting support application by reading the communication tag Tg installed in the meeting room by his/her own user terminal 2. Therefore, the user does not need to perform an operation for inputting login information (for example, a user ID and a password) to the meeting support application when starting the meeting, and therefore can save time and effort for starting the meeting. Accordingly, the user can easily start the meeting, and efficiently conduct the meeting.

In this embodiment, login to the meeting support application in the meeting room terminal 3 installed in the meeting room 1 is performed by reading of the communication tag Tg1 by the user terminal 2 in the meeting room 1 by the user U1, while the meeting system 100 executes the same process also in the meeting room 2. Specifically, the user U5 reads the communication tag Tg2 by the user terminal 2 in the meeting room 2 (see FIG. 1), so that the meeting system 100 logs in to the meeting support application in the meeting room terminal 3 installed in the meeting room 2. The meeting system 100 implements an online meeting in the meeting room 1 and the meeting room 2 by logging in to the meeting support application of each of the meeting room 1 and the meeting room 2.

In this embodiment, the meeting system 100 includes the meeting room terminal 3 installed in the meeting room, in a case where the management server 1 permits to log in to the meeting support application of the meeting, the management server 1 transmits the user information to the meeting room terminal 3, and in a case where the meeting room terminal 3 executes the login process to the meeting support application on the basis of the user information received from the management server 1, and the login process is completed, the meeting room terminal 3 displays the meeting support application screen (meeting screen) on the display 4 installed in the meeting room.

The present disclosure is not limited to the above-described embodiment. In other embodiment, the meeting room terminal 3 may be omitted in the meeting system 100. Specifically, the user terminal 2 may include the function of the meeting room terminal 3. For example, when the user terminal 2 receives the login permission information from the management server 1, starts the meeting support application, and executes the login process. Then, the user terminal 2 displays the meeting support application screen (for example, see FIG. 11) on its own operation display 23, and starts a meeting. The user terminal 2 may display the meeting support application screen on the display 4.

In other embodiment, the user terminal 2 may include the function of the management server 1 and the function of the meeting room terminal 3. For example, the user terminal 2 identifies a meeting in which a user is scheduled to participate on the basis of the tag ID read from the communication tag Tg and the user information. The user terminal 2 may access a server that manages a meeting schedule, identify the meeting corresponding to the tag ID and the user information, and determine whether or not login to the meeting support application is possible, for example. When the user terminal 2 determines that the login is possible, the user terminal 2 starts the meeting support application and executes the login process.

As described above, the meeting support system of the present disclosure may be composed of the management server 1, the user terminal 2, and the meeting room terminal 3 as illustrated in FIG. 2, may be composed of the management server 1 and the user terminal 2, or may be composed of the user terminal 2 alone.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A meeting support system that includes a user terminal of a user who participates in a meeting in a meeting room, and executes a meeting support application of the meeting, the meeting support system comprising:
    an acquisition circuit that acquires medium information corresponding to a communication medium installed in the meeting room, by communication of the user terminal with the communication medium; and
    a permission circuit that identifies a meeting in which the user is scheduled to participate, on the basis of user information for identifying the user and the medium information, wherein the permission circuit permits login to a meeting support application of the identified meeting, wherein the user terminal includes a reader that reads a medium identification information for identifying the communication medium, and the acquisition circuit acquires the medium identification information read by the reader, wherein meeting reservation information in which one or a plurality of pieces of meeting information including the user information and meeting room identification information for identifying the meeting room associated with the medium identification information that are registered is included, and the permission circuit transmits the meeting information corresponding to the user information and the medium identification information to the user terminal, in a case where the login to the meeting support application is permitted.

2. The meeting support system according to claim 1, further comprising a login circuit that executes a login process to the meeting support application on the basis of the user information, in a case where the login to the meeting support application of the meeting is permitted by the permission circuit.

3. The meeting support system according to claim 1, further comprising a reception circuit that receives a display instruction for a material usable for the meeting in the user terminal, in a case where the login to the meeting support application of the meeting is permitted by the permission circuit.

4. The meeting support system according to claim 1, further comprising a transmission circuit that transmits meeting information specified by the user, from among a plurality of pieces of the meeting information displayed on the user terminal and the user information, to a meeting room terminal that is installed in the meeting room, wherein the transmission circuit includes a login circuit which executes a login process to the meeting support application on the basis of the user information.

5. A meeting support system that includes a user terminal of a user who participates in a meeting in a meeting room, and executes a meeting support application of the meeting, the meeting support system comprising:

an acquisition circuit that acquires medium information corresponding to a communication medium installed in the meeting room, by communication of the user terminal with the communication medium;

a permission circuit that identifies a meeting in which the user is scheduled to participate, on the basis of user information for identifying the user and the medium information, wherein the permission circuit permits login to a meeting support application of the identified meeting;

a login circuit that executes a login process to the meeting support application on the basis of the user information, in a case where the login to the meeting support application of the meeting is permitted by the permission circuit;

a management server that manages meeting reservation information and meeting room information related to the meeting room, and includes the permission circuit; and a meeting room terminal that is installed in the meeting room, and includes the login circuit, wherein the management server further transmits the user information to the meeting room terminal, in a case where the login to the meeting support application of the meeting is permitted, and the meeting room terminal executes the login process to the meeting support application on the basis of the user information received from the management server, and displays a meeting screen on a display installed in the meeting room, in a case where the login process is completed.

6. The meeting support system according to claim 5, wherein in a case where a display instruction for a material usable for the meeting is received from the user terminal, the meeting room terminal displays the material on the display.

7. A meeting support method for executing a meeting support application of a meeting in which a user participates in a meeting room, the meeting support method comprising causing one or a plurality of processors to:

acquire medium information corresponding to a communication medium of the user installed in the meeting room by communication of a user terminal with the communication medium;

identify a meeting in which the user is scheduled to participate, on the basis of user information for identifying the user and the medium information; and permit login to a meeting support application of the identified meeting;

execute a login process to the meeting support application on the basis of the user information, in a case where the login to the meeting support application of the meeting is permitted; and manage meeting reservation information and meeting room information related to the meeting room; and wherein the one or a plurality of processors is caused to further transmit the user information to a meeting room terminal that is installed in the meeting room, in a case where the login to the meeting support application of the meeting is permitted, and wherein the meeting room terminal executes the login process to the meeting support application on the basis of the user information received from the one or the plurality of processors, and displays a meeting screen on a display installed in the meeting room, in a case where the login process is completed.

* * * * *